US010075475B2

(12) United States Patent
Carpenter

(10) Patent No.: US 10,075,475 B2
(45) Date of Patent: Sep. 11, 2018

(54) APPARATUS AND METHOD FOR DYNAMIC CUSTOMIZATION OF CYBER-SECURITY RISK ITEM RULES

(71) Applicant: Honeywell International Inc., Morris Plains, NJ (US)

(72) Inventor: Seth G. Carpenter, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/871,605

(22) Filed: Sep. 30, 2015

(65) Prior Publication Data

US 2016/0234252 A1 Aug. 11, 2016

Related U.S. Application Data

(60) Provisional application No. 62/113,152, filed on Feb. 6, 2015, provisional application No. 62/114,928, filed on Feb. 11, 2015.

(51) Int. Cl.
*H04L 12/24* (2006.01)
*H04L 29/06* (2006.01)

(52) U.S. Cl.
CPC .............. *H04L 63/20* (2013.01); *H04L 41/22* (2013.01); *H04L 63/1433* (2013.01)

(58) Field of Classification Search
CPC ..... H04L 63/00; H04L 63/14; H04L 63/1408; H04L 63/1416; H04L 63/1433;
(Continued)

(56) References Cited

U.S. PATENT DOCUMENTS 6,266,773 B1 7/2001 Kisor et al.
7,136,856 B2 11/2006 Birbo et al.
(Continued)

FOREIGN PATENT DOCUMENTS

JP 2008-112284 5/2008
KR 10-2005-0068052 7/2005
(Continued)

OTHER PUBLICATIONS

Notification of Transmittal of International Search Report and the Written Opinion of the International Searching Authority, or the Declaration dated Jun. 3, 2016 in connection with International Application No. PCT/US2016/016798, 10 pages.
(Continued)

*Primary Examiner* — Eric W Shepperd

(57) ABSTRACT

This disclosure provides an apparatus and method for dynamic customization of cyber-security risk item rules. A method includes obtaining information defining a rule by a risk manager system, the rule identifying a cyber-security risk to a computing device in an industrial process control and automation system. The method includes presenting a textual description describing the rule to a user by the risk manager system, the textual description including a selectable configuration parameter associated with the rule. The method includes receiving the user's selection of the configuration parameter by the risk manager system. The method includes, in response to receiving the user's selection of the configuration parameter, receiving a value associated with the configuration parameter from the user by the risk manager system.

22 Claims, 8 Drawing Sheets

(58) Field of Classification Search
CPC ....... H04L 43/00; H04L 43/04; H04L 43/045; H04L 43/16; H04L 41/06; H04L 41/0609; H04L 41/0866; H04L 41/0893; G06F 21/00; G06F 21/50; G06F 21/55–21/554; G06F 21/577; G06F 2221/21; G06F 17/2235; G06F 3/04847; G06Q 10/00; G06Q 10/06; G06Q 10/063; G06Q 10/0635
USPC ....... 707/700, 710, 711, 735, 736, 747, 760, 707/809, 833, 834

See application file for complete search history.

(56) References Cited

U.S. PATENT DOCUMENTS

| | | | |
|---|---|---|---|
| 7,152,105 B2 | 12/2006 | McClure et al. | |
| 7,415,503 B2 | 8/2008 | Chemoguzov | |
| 7,627,891 B2 | 12/2009 | Williams et al. | |
| 7,885,981 B2* | 2/2011 | Kaufman | G06F 17/30572 707/728 |
| 7,900,259 B2 | 3/2011 | Jeschke et al. | |
| 7,908,660 B2 | 3/2011 | Bahl | |
| 7,921,459 B2 | 4/2011 | Houston et al. | |
| 7,984,504 B2 | 7/2011 | Hernacki et al. | |
| 8,020,210 B2 | 9/2011 | Tippett et al. | |
| 8,087,087 B1 | 12/2011 | Oorschot et al. | |
| 8,141,155 B2 | 3/2012 | Jeschke et al. | |
| 8,392,995 B2 | 3/2013 | Williamson et al. | |
| 8,438,643 B2 | 5/2013 | Wiemer et al. | |
| 8,494,974 B2 | 7/2013 | Watters et al. | |
| 8,595,831 B2 | 11/2013 | Skare | |
| 8,595,844 B2 | 11/2013 | Bahl | |
| 8,621,637 B2 | 12/2013 | Al-Harbi et al. | |
| 8,682,961 B2* | 3/2014 | Arav | G06Q 10/107 709/203 |
| 8,712,596 B2 | 4/2014 | Scott | |
| 8,726,393 B2 | 5/2014 | Macy et al. | |
| 8,763,074 B2 | 6/2014 | Bechtel et al. | |
| 8,769,412 B2 | 7/2014 | Gill et al. | |
| 8,776,168 B1 | 7/2014 | Gibson et al. | |
| 8,806,632 B2 | 8/2014 | Stefanidakis et al. | |
| 8,856,936 B2 | 10/2014 | Datta Ray et al. | |
| 9,166,999 B1 | 10/2015 | Kulkarni et al. | |
| 9,373,267 B2 | 6/2016 | Sadeh-Koniecpol et al. | |
| 9,401,926 B1 | 7/2016 | Dubow et al. | |
| 2003/0126472 A1 | 7/2003 | Banzhof | |
| 2003/0154393 A1 | 8/2003 | Young | |
| 2004/0030531 A1 | 2/2004 | Miller et al. | |
| 2004/0193907 A1 | 9/2004 | Patanella | |
| 2005/0010821 A1 | 1/2005 | Cooper et al. | |
| 2005/0144480 A1 | 6/2005 | Kim et al. | |
| 2005/0193430 A1 | 9/2005 | Cohen et al. | |
| 2005/0283751 A1* | 12/2005 | Bassin | G06Q 10/06 717/100 |
| 2006/0010493 A1 | 1/2006 | Piesco et al. | |
| 2006/0085852 A1 | 4/2006 | Sima | |
| 2006/0101517 A1 | 5/2006 | Banzhof et al. | |
| 2006/0117388 A1 | 6/2006 | Nelson et al. | |
| 2006/0123482 A1 | 6/2006 | Aaron | |
| 2006/0126501 A1 | 6/2006 | Ramaswamy | |
| 2006/0174121 A1 | 8/2006 | Omae et al. | |
| 2006/0206941 A1 | 9/2006 | Collins | |
| 2006/0239645 A1 | 10/2006 | Curtner et al. | |
| 2007/0067846 A1 | 3/2007 | McFarlane et al. | |
| 2007/0094491 A1 | 4/2007 | Teo et al. | |
| 2007/0143851 A1 | 6/2007 | Nicodemus et al. | |
| 2007/0223398 A1 | 9/2007 | Luo et al. | |
| 2007/0226794 A1 | 9/2007 | Howcroft et al. | |
| 2007/0289008 A1 | 12/2007 | Andreev et al. | |
| 2008/0016339 A1* | 1/2008 | Shukla | G06F 21/53 713/164 |
| 2008/0047016 A1 | 2/2008 | Spoonamore | |
| 2008/0141377 A1 | 6/2008 | Dunagan et al. | |
| 2008/0172347 A1 | 7/2008 | Bernoth et al. | |
| 2008/0189788 A1 | 8/2008 | Bahl | |
| 2008/0209567 A1 | 8/2008 | Lockhart et al. | |
| 2008/0229420 A1 | 9/2008 | Jeschke et al. | |
| 2008/0235196 A1 | 9/2008 | Broussard et al. | |
| 2008/0262822 A1 | 10/2008 | Hardwick et al. | |
| 2009/0024663 A1 | 1/2009 | McGovern | |
| 2009/0121860 A1 | 5/2009 | Kimmel et al. | |
| 2009/0228316 A1 | 9/2009 | Foley et al. | |
| 2010/0121929 A1 | 5/2010 | Lin | |
| 2010/0125911 A1 | 5/2010 | Bhaskaran | |
| 2010/0125912 A1 | 5/2010 | Greenshpon et al. | |
| 2010/0242114 A1 | 9/2010 | Bunker et al. | |
| 2010/0318512 A1 | 12/2010 | Ludwig | |
| 2010/0324945 A1 | 12/2010 | Hessing | |
| 2011/0039237 A1 | 2/2011 | Skare | |
| 2011/0126111 A1 | 5/2011 | Gill et al. | |
| 2011/0162073 A1 | 6/2011 | Jeschke et al. | |
| 2011/0231412 A1 | 9/2011 | Kariv | |
| 2011/0288692 A1 | 11/2011 | Scott | |
| 2012/0011077 A1 | 1/2012 | Bhagat | |
| 2012/0011590 A1 | 1/2012 | Donovan | |
| 2012/0109834 A1 | 5/2012 | Bongiovanni et al. | |
| 2012/0180133 A1 | 7/2012 | Al-Harbi et al. | |
| 2012/0224057 A1 | 9/2012 | Gill et al. | |
| 2012/0255003 A1 | 10/2012 | Sallam | |
| 2012/0268269 A1 | 10/2012 | Doyle | |
| 2013/0031037 A1 | 1/2013 | Brandt et al. | |
| 2013/0067558 A1 | 3/2013 | Markham et al. | |
| 2013/0111275 A1 | 5/2013 | Ganesan et al. | |
| 2013/0160119 A1 | 6/2013 | Sartin et al. | |
| 2013/0174259 A1 | 7/2013 | Pearcy et al. | |
| 2013/0212685 A1 | 8/2013 | Kelley et al. | |
| 2013/0239177 A1 | 9/2013 | Sigurdson et al. | |
| 2013/0247207 A1 | 9/2013 | Hugard et al. | |
| 2013/0283336 A1 | 10/2013 | Macy et al. | |
| 2013/0298244 A1 | 11/2013 | Kumar et al. | |
| 2013/0326002 A1 | 12/2013 | Leuoth et al. | |
| 2013/0347107 A1* | 12/2013 | Williams | H04L 12/2602 726/22 |
| 2014/0007244 A1 | 1/2014 | Martin et al. | |
| 2014/0082738 A1 | 3/2014 | Bahl | |
| 2014/0130121 A1 | 5/2014 | Lin | |
| 2014/0137257 A1 | 5/2014 | Martinez et al. | |
| 2014/0165128 A1 | 6/2014 | Auvenshine et al. | |
| 2014/0215555 A1* | 7/2014 | Barton | G06F 9/45533 726/1 |
| 2014/0236668 A1 | 8/2014 | Young et al. | |
| 2014/0283083 A1 | 9/2014 | Gula et al. | |
| 2014/0289207 A1* | 9/2014 | Moloian | G06F 17/30371 707/687 |
| 2014/0289796 A1* | 9/2014 | Moloian | G06F 21/57 726/2 |
| 2014/0297495 A1 | 10/2014 | Dalal et al. | |
| 2014/0298423 A1* | 10/2014 | Moloian | H04L 63/10 726/4 |
| 2014/0305525 A1 | 10/2014 | Le Moing et al. | |
| 2014/0337086 A1 | 11/2014 | Asenjo et al. | |
| 2014/0359777 A1 | 12/2014 | Lam et al. | |
| 2015/0018984 A1* | 1/2015 | Williams | G05B 23/0272 700/83 |
| 2015/0032839 A1 | 1/2015 | Serokurov et al. | |
| 2015/0033323 A1 | 1/2015 | Oliphant et al. | |
| 2015/0033337 A1 | 1/2015 | Baikalov et al. | |
| 2015/0163242 A1 | 6/2015 | Laidlaw et al. | |
| 2015/0213246 A1* | 7/2015 | Turgeman | G06F 21/32 726/23 |
| 2015/0213369 A1 | 7/2015 | Brandt et al. | |
| 2015/0242769 A1* | 8/2015 | Kezeu | G06Q 10/063 705/7.11 |
| 2015/0264061 A1 | 9/2015 | Ibatullin et al. | |
| 2015/0281287 A1 | 10/2015 | Gill et al. | |
| 2015/0370983 A1* | 12/2015 | Vial | G06F 19/3412 705/2 |
| 2016/0011921 A1 | 1/2016 | Rao et al. | |
| 2016/0164892 A1 | 6/2016 | Satish et al. | |
| 2016/0205126 A1 | 7/2016 | Boyer et al. | |
| 2016/0205143 A1 | 7/2016 | Bryson et al. | |
| 2016/0212165 A1 | 7/2016 | Singla et al. | |

(56) References Cited

U.S. PATENT DOCUMENTS

2016/0217160 A1 7/2016 Croft
2016/0330222 A1 11/2016 Brandt et al.
2017/0013011 A1* 1/2017 Renouil ............... G06Q 20/085

FOREIGN PATENT DOCUMENTS

KR       10-1060277     8/2011
KR   10-2014-0097691     8/2014
WO   WO 2013/166126 A1   11/2013

OTHER PUBLICATIONS

Notification of Transmittal of International Search Report and the Written Opinion of the International Searching Authority, or the Declaration dated May 13, 2016 in connection with International Application No. PCT/US2016/015890, 11 pages.

Notification of Transmittal of International Search Report and the Written Opinion of the International Searching Authority, or the Declaration dated May 13, 2016 in connection with International Application No. PCT/US2016/016098, 12 page.

Notification of Transmittal of International Search Report and the Written Opinion of the International Searching Authority, or the Declaration dated Jun. 13, 2016 in connection with International Application No. PCT/US2016/016496, 12 pages.

Notification of Transmittal of International Search Report and the Written Opinion of the International Searching Authority, or the Declaration dated Jun. 3, 2016 in connection with International Application No. PCT/US2016/016399, 11 pages.

Notification of Transmittal of International Search Report and the Written Opinion of the International Searching Authority, or the Declaration dated Jun. 3, 2016 in connection with International Application No. PCT/US2016/016265, 10 pages.

Notification of Transmittal of International Search Report and the Written Opinion of the International Searching Authority, or the Declaration dated Jun. 2, 2016 in connection with International Application No. PCT/US2016/015952, 11 pages.

Notification of Transmittal of International Search Report and the Written Opinion of the International Searching Authority, or the Declaration dated May 18, 2016 in connection with International Application No. PCT/US2016/016159, 11 pages.

Gerhards, R.; "The Syslog Protocol"; Network Working Group; Adiscon GmbH; Mar. 2009; 38 pages.

Knapp, E.D.; "Security Intelligence and Analytics in Industrial Systems"; Honeywell Users Group Europe, Middle East and Africa; 2014; 29 pages.

Koelemij, E.D.; "Effective Defense in Depth Strategies for Industrial Control Systems"; Honeywell Users Group Europe, Middle East and Africa; 2014; 21 pages.

Koelemij, S.; "Designing a Secure Industrial Control System"; Honeywell Users Group EMEA; Industrial IT Solutions: 2013; 11 pages.

Koelemij, S.; "Making Cyber Security S.M.A.R.T."; Honeywell Industrial Cyber Security; EMEA HUG Training Session; 2014; 63 pages.

Ricks, B.; "System Center 2012 R2 Operations Manager Documentation"; Microsoft System Center 2012 R2; Microsoft Corp; Nov. 1, 2013; 1389 pages.

Spear, M.; "Industrial Cyber Security 101"; Honeywell Users Group Europe, Middle East and Africa; 2015; 25 pages.

"Certification Testing Specification"; OPC Foundation; Release Candidate 1.02; May 28, 2014; 20 pages.

"Guide for Conducting Risk Assessments—Information Security"; NIST Special Publication 800-30, Revision 1; NIST, U.S. Dept of Commerce; Sep. 2012; 95 pages.

"Honeywell Industrial Cyber Security Overview and Managed Industrial Cyber Security Services"; HPS; Jun. 4, 2014; 19 pages.

"Information Technology—Security Techniques—Information Security Risk Management"; Bio Standards Publication; BS ISO/IEC 27005;2011; 80 pages.

"Risk Management and Critical Infrastructure Protection: Assessing, Integrating, and Managing Threats, Vulnerabilities and Consequences"; CRS Rpt for Congress; RL32561; Feb. 4, 2005; 28 pages.

"Security for Industrial Automation and Control Systems Part 2-3: Patch Management in the IACS Environment"; ISA-TR62443-2-3-2015; Jul. 1, 2015; 18 pages.

"Design and Planning Guide for System Center 2012-Operations Manager"; System Center 2012; Microsoft Corporation; Apr. 2012; 13 pages.

Notification of Transmittal of the International Search Report and the Written Opinion of the International Searching Authority dated Aug. 1, 2016 in connection with International Application No. PCT/US2016/028553, 10 pages.

Hutzler, D., "How to Prevent Attacks on Air Gapped Networks," OPSWAT Blog, https://www.opswat.com/blog/how-prevent-attacks-air-gapped-networks, Jan. 16, 2015, 5 pages.

Marshall, R., "Guest Post: How to Configure Alerts in System Center 2012," https://blogs.technet.microsoft.com/uktechnet/2013/04/08/guest-post-how-to-configure-alerts-in-system-center-2012/, Apr. 8, 2013, 9 pages.

"Symantec™ Control Compliance Suite 11.0 User Guide," Symantec Corporation, https://www.scribd.com/document/126556709/CCS-User-Guide; 2012, 952 pages.

"Configuring Symantec Vulnerability Assessment 1.0 for Network Audits," TECH111985, https://support.symantec.com/en_US/article.TECH111985.html, Jan. 16, 2003, 6 pages.

"iPost: Implementing Continuous Risk Monitoring at the Department of State," Enterprise Network Management, U.S. Department of State, Information Resource Management Office of Information Assurance, Version 1.5, May 14, 2010, 28 pages.

U.S. Appl. No. 14/871,695, Non-Final Office Action dated Dec. 16, 2016, 11 pages.

U.S. Appl. No. 14/871,521, Non-Final Office Action dated Dec. 19, 2016, 11 pages.

U.S. Appl. No. 14/871,855, Non-Final Office Action dated Jan. 18, 2017, 12 pages.

U.S. Appl. No. 14/871,732, Non-Final Office Action dated Dec. 30, 2016, 36 pages.

U.S. Appl. No. 14/871,503, Non-Final Office Action dated Dec. 28, 2016, 11 pages.

U.S. Appl. No. 14/871,547, Non-Final Office Action dated Dec. 16, 2016, 12 pages.

U.S. Appl. No. 14/871,814, Non-Final Office Action dated Dec. 16, 2016, 7 pages.

U.S. Appl. No. 14/871,136, Non-Final Office Action dated Dec. 2, 2016, 18 pages.

U.S. Appl. No. 14/705,379, Non-Final Office Action dated Feb. 7, 2017, 7 pages.

* cited by examiner

Cyber Security Dashboard https://securitynode44590/csd/home.aspx

202 Return to Dashboard ...

| Risk Item | Device Impact | Zone Impact | Frequency Impact | Event Decay |
|---|---|---|---|---|
| − Endpoint Security | | | | |
| − Antivirus | | | | |
| − AV-Present | | | | |
| System | 90 | 0 | 0 | N/A |
| Zone 1 | 90 | 0 | 0 | N/A |
| Zone 2 | 90 | 0 | 0 | N/A |
| Zone 3 | 85 | 10 | 0 | N/A |
| + AV-Enabled | 10 to 75 | 0 | 0 | N/A |
| + AV-Definition-File-Version | 100 | 20 | 20 | 3 days |
| + AV-Threat-Detected | | | | |
| + Application Whitelisting | | | | |
| + Windows Security Events | | | | |
| + Network Security | | | | |
| + Patches | | | | |
| + Backup | | | | |

Import Configuration | Export Current Configuration | Reset to Defaults

Tabs: Device/Zone Configuration | Risk Item Weights | Event Aging | Aggregation Functions

| System |
|--------|
| Zone 1 |
| Zone 2 |
| Zone 3 |

| Risk Item | Device Impact | Zone Impact | Frequency Impact | Event Decay |
|-----------|---------------|-------------|------------------|-------------|
| − Endpoint Security | | | | |
| − Antivirus | | | | |
| AV-Present | 90 | 0 | 0 | N/A |
| AV-Enabled | 85 | 10 | 0 | N/A |
| AV-Definition-File-Version | 10 to 75 | 0 | 0 | N/A |
| AV-Threat-Detected | 100 | 20 | 20 | 3 days |
| + Application Whitelisting | | | | |
| + Windows Security Events | | | | |
| + Network Security | | | | |
| + Patches | | | | |
| + Backup | | | | |

Tabs: Device/Zone Configuration | Risk Item Weights | Event Aging | Aggregation Functions Import Configuration | Export Current Configuration | Reset to Defaults Cyber Security Dashboard
Return to Dashboard

FIG. 2B

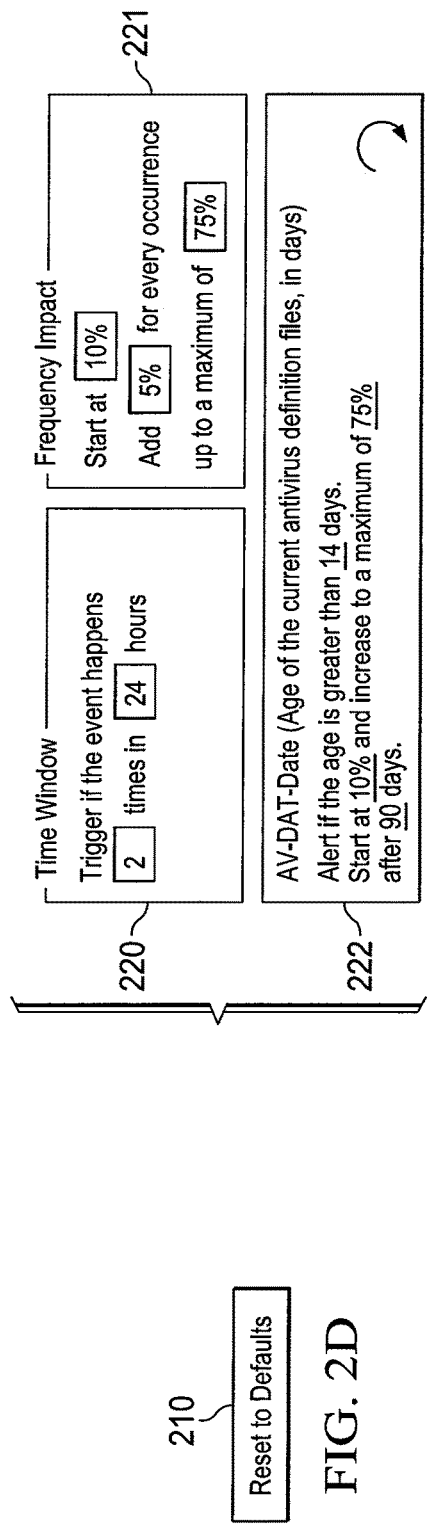

| Device | Zone | Type | IP Address |
|---|---|---|---|
| ESVT-01A | Unassigned | ESVT | 10.0.0.10 |
| ESVT-01B | Unassigned ▼ / STBE-ESVT01 / STBE-COAA | ESVT | 10.0.0.12 |
| EST-101 | Unassigned | ES-T | 10.0.0.14 |
| EST-102 | Unassigned | ES-T | 10.0.0.16 |
| EST-103 | Unassigned | ES-T | 10.0.0.18 |
| EST-104 | Unassigned | ES-T | 10.0.0.20 |
| EST-105 | Unassigned | ES-T | 10.0.0.22 |
| EST-106 | Unassigned | ES-T | 10.0.0.24 |
| EST-107 | Unassigned | ES-T | 10.0.0.26 |
| EST-108 | Unassigned | ES-F | 10.0.0.28 |
| ESF-201 | Unassigned | ES-F | 10.0.0.30 |
| ESF-202 | Unassigned | ES-F | 10.0.0.32 |
| ESF-203 | Unassigned | ES-F | 10.0.0.34 |
| ESF-204 | Unassigned | ES-F | 10.0.0.36 |
| L3 Switch G | Unassigned | Switch | 10.0.0.242 |
| L3 Switch Y | Unassigned | Switch | 10.0.0.244 |

APPARATUS AND METHOD FOR DYNAMIC CUSTOMIZATION OF CYBER-SECURITY RISK ITEM RULES

CROSS-REFERENCE TO RELATED APPLICATION

This application claims the benefit of the filing date of U.S. Provisional Patent Applications 62/113,152, filed Feb. 6, 2015, and 62/114,928, filed Feb. 11, 2015, which are hereby incorporated by reference.

TECHNICAL FIELD

This disclosure relates generally to network security. More specifically, this disclosure relates to an apparatus and method for dynamic customization of cyber-security risk item rules.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides an apparatus and method for dynamic customization of cyber-security risk item rules.

A method includes obtaining information defining a rule by a risk manager system, the rule identifying a cyber-security risk to a computing device in an industrial process control and automation system. The method includes presenting a textual description describing the rule to a user by the risk manager system, the textual description including a selectable configuration parameter associated with the rule. The method includes receiving the user's selection of the configuration parameter by the risk manager system. The method includes, in response to receiving the user's selection of the configuration parameter, receiving a value associated with the configuration parameter from the user by the risk manager system.

Another method includes interacting with a user, by a risk manager system, to define a plurality of rules for risk items to be monitored among a plurality of connected devices. The method includes mapping each of the rules to a corresponding one or more of the connected devices by the risk manager system. The method includes monitoring the connected devices according to the rules by the risk manager system. The method includes displaying an output based on the rules and a status of the connected devices by the risk manager system.

Other technical features may be readily apparent to one skilled in the art from the following Figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A through 2H illustrate example graphical user interface mechanisms supporting dynamic customization of cyber-security risk item rules according to this disclosure.

DETAILED DESCRIPTION

The figures, discussed below, and the various embodiments used to describe the principles of the present invention in this document are by way of illustration only and should not be construed in any way to limit the scope of the invention. Those skilled in the art will understand that the principles of the invention may be implemented in any type of suitably arranged device or system.

Figure 1:
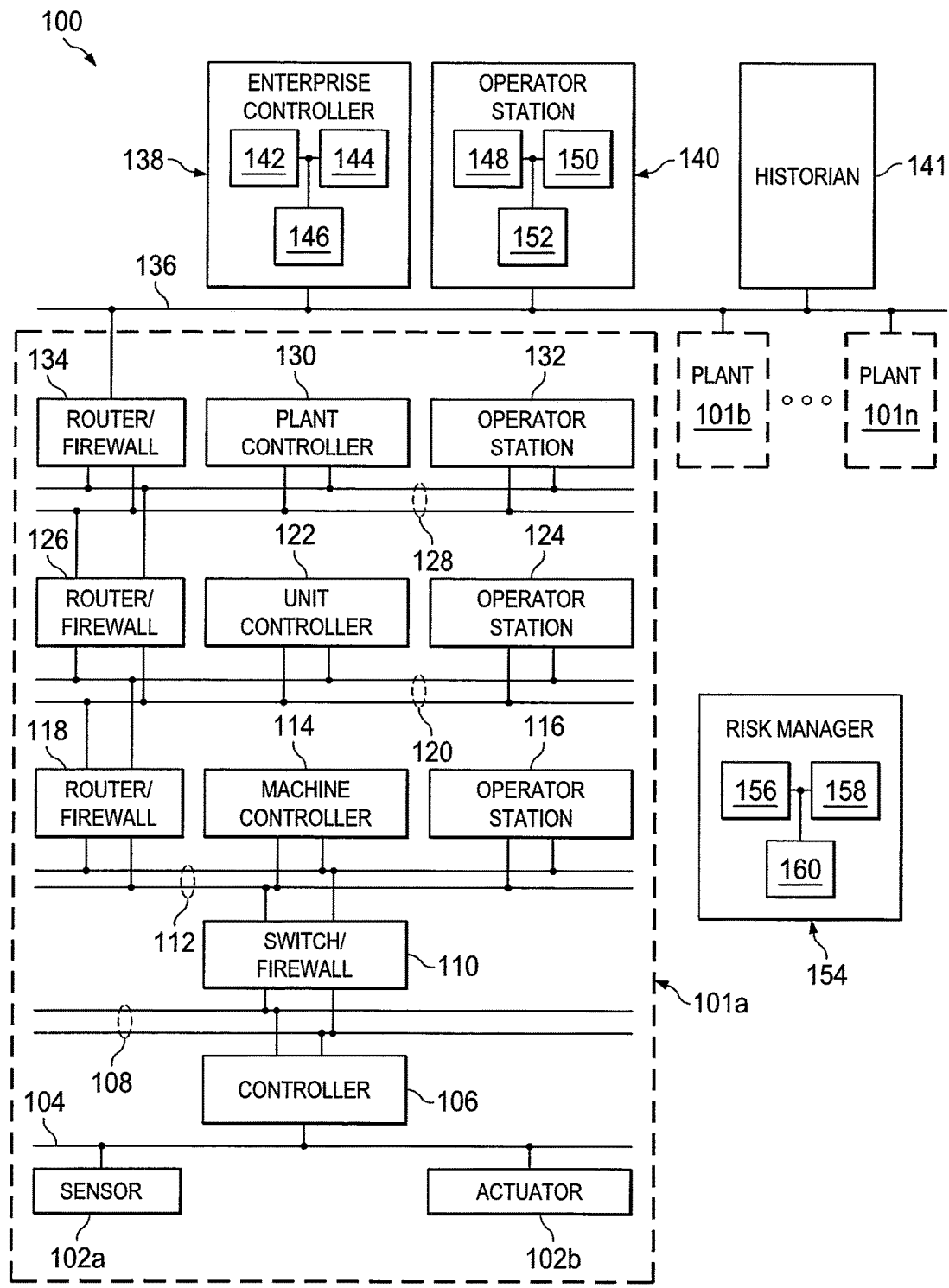
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Unaddressed security vulnerabilities in any of the components in the system 100 could be exploited by attackers to disrupt operations or cause unsafe conditions in an industrial facility. However, in many instances, operators do not have a complete understanding or inventory of all equipment running at a particular industrial site. As a result, it is often difficult to quickly determine potential sources of risk to a control and automation system. Exposing the appropriate level of customization can be difficult. Many products offer customization options that are either too simplistic (not allowing sufficient flexibility) or too complex (requiring additional training or hiring external contractors to customize the solution).

Disclosed embodiments understand potential vulnerabilities in various systems, prioritize the vulnerabilities based on risk to an overall system, and guide a user to mitigate the vulnerabilities. Moreover, to be of value to a variety of users across different industries, disclosed embodiments are customizable since, for instance, a risk to a system that might be of little concern to one user might be critical to another user.

Disclosed embodiments provide parameterized rules, which helps to avoid the overly-complicated scenario where a user needs to write his or her own rule logic or use a complex logic building utility. The rules can be carefully matched to the risk items they represent to provide the appropriate level of flexibility.

Disclosed embodiments also provide an effective and intuitive interface for configuring these rules and their parameters. If presented in a traditional configuration screen, the configuration process can quickly become overwhelming. There is also often a need for supplemental documentation to explain the meaning of each parameter and how the parameters relate to one another. According to disclosed embodiments, configuration parameters are exposed in the context of a plain text explanation of what the rule will do. The configurable parameters can appear similar to hyperlinks within the text. A user can click on the values and modify them directly in place. This is a much simpler configuration experience and helps to avoid the need for supplemental documentation.

In various embodiments, this is accomplished (among other ways) using a risk manager 154 (also referred to as the risk manager system). Among other things, the risk manager 154 supports this technique for dynamic customization of cyber-security risk item rules. The risk manager 154 includes any suitable structure that supports automatic handling of cyber-security risk events. Here, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

FIGS. 2A through 2H illustrate example graphical user interface mechanisms supporting dynamic customization of cyber-security risk item rules according to this disclosure. In some embodiments, dynamic customization of cyber-security risk item rules involves the following steps. First, appropriate rules are defined for parameters/risk items to be monitored. These rules are mapped to individual risk items to be monitored. Second, a configuration text template can be defined. This could be done generically for a rule type. It could also be customized further for each individual risk item.

FIGS. 2A-2H show various example configurations that could be used to dynamically customize cyber-security risk item rules.

FIG. 2A illustrates a cyber security dashboard 201 in accordance with disclosed embodiments used, in this example, to illustrate risk item weights 202. The individual risk items 203, in this example, include various security types, with weighting parameter values for the system and various zones and elements, as depicted. Each risk item can have weighting parameters for device impact, zone impact, frequency impact, and event decay. In this example, note that risk item 203 for "AV-Present" is expanded to show sub-elements System and Zones 1-3, each having its own weighting parameters. The system can automatically generate the risk item rules using the user's input from the cyber security dashboard 201.

FIG. 2B illustrates another example of cyber security dashboard 201 in accordance with disclosed embodiments used, in this example, to illustrate risk item weights 202. The individual risk items 203, in this example, include various security types, with weighting parameter values for the system and various zones and elements, as depicted. Each risk item can have weighting parameters for device impact, zone impact, frequency impact, and event decay. In this example, note that risk item 203 for "AV-Present" is collapsed and shows with the weighting parameters of (now hidden) sub-elements System and Zones 1-3. The system can automatically generate the risk item rules using the user's input from the cyber security dashboard 201.

Figure 2C:
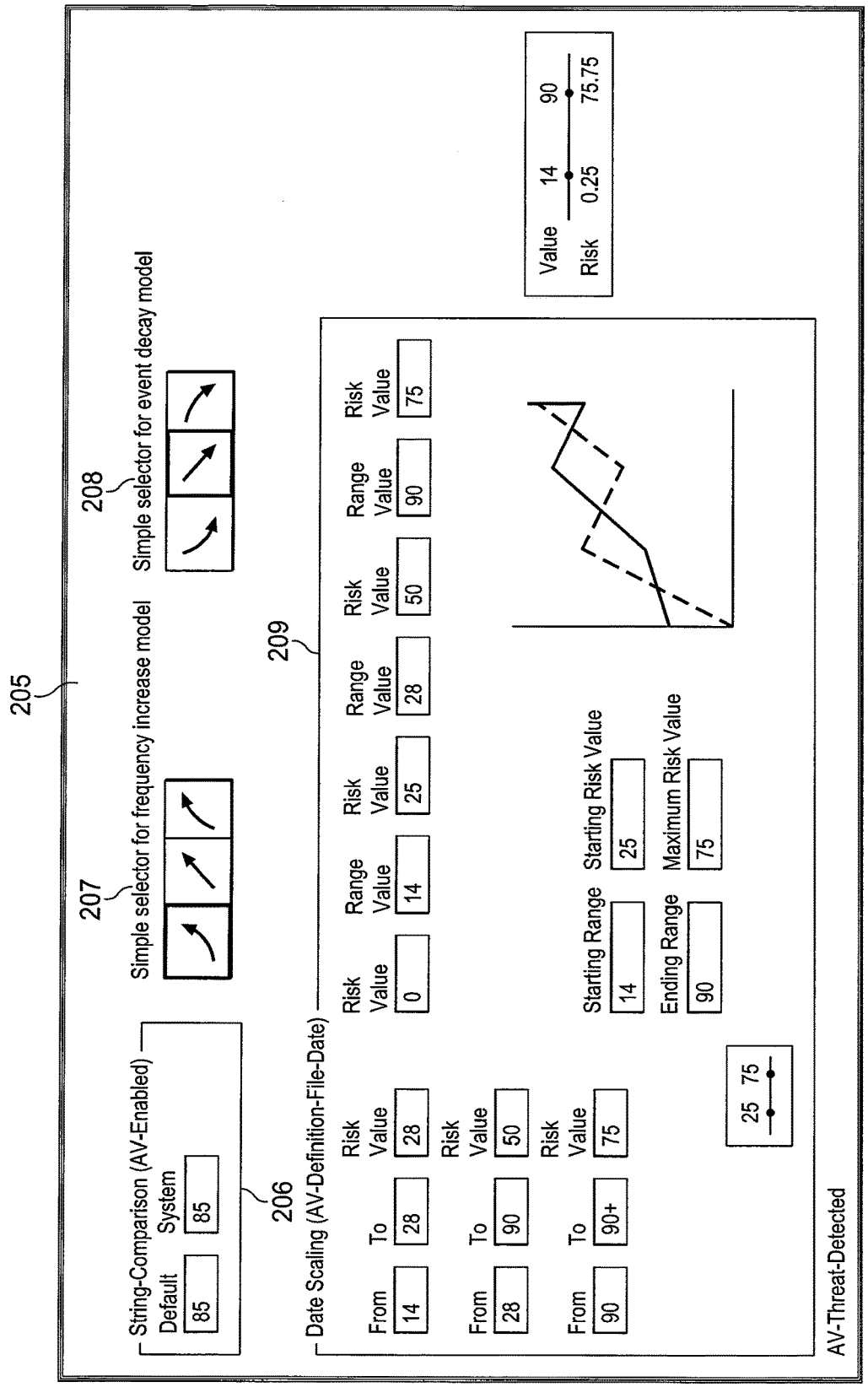

FIG. 2C illustrates a risk items rules user interface 205 in accordance with disclosed embodiments. In this example, a parameter-entry area is shown for string comparison 206, which has entries for a default value and a system value. This example also shows a simple selector for a frequency increase model 207, with selector buttons for a desired frequency increase curve. This example also shows a simple selector for an event decay model 208, with selector buttons for a desired event decay curve. This example also shows a data scaling entry area 209, which allows the user to define risk ranges and associated values for the risk item rules. The system can automatically generate the risk item rules using the user's input from the risk items rules user interface 205.

FIG. 2D illustrates a "reset to defaults" button 210 that can reset all custom settings to default. Similar reset buttons can be used for individual parameter items. Resets can be applied to just the current interface screen, can be applied only at the system level, or can be applied to all zones as well. Examples of such reset buttons are reset system settings, reset system and zone settings, reset all visible settings, and others.

FIG. 2E illustrates other user interfaces in accordance with disclosed embodiments, used to customize risk item rules as disclosed herein. This example shows a time window interface 220 for customizing risk item triggers by time, indicating that an alert should be triggered based on how many times an event happens in a given time period. This example also shows a frequency impact interface 221 that allows users to adjust to "impact" of a risk item based on the frequency it occurs. This example also shows a risk-aging interface 222 that allows a user to customize an alert based on an aging parameter, such as the age of an antivirus definition file. As an example, risk-aging interface 222 describes a rule in simple text, rather than requiring complicated tables or groups of configuration boxes. Each underlined part of this rule represents a configurable parameter of the rule. Clicking on the parameter could change it into an editable field (similar to the boxes shown in time window interface 220 and frequency impact interface 221).

Figure 2F:
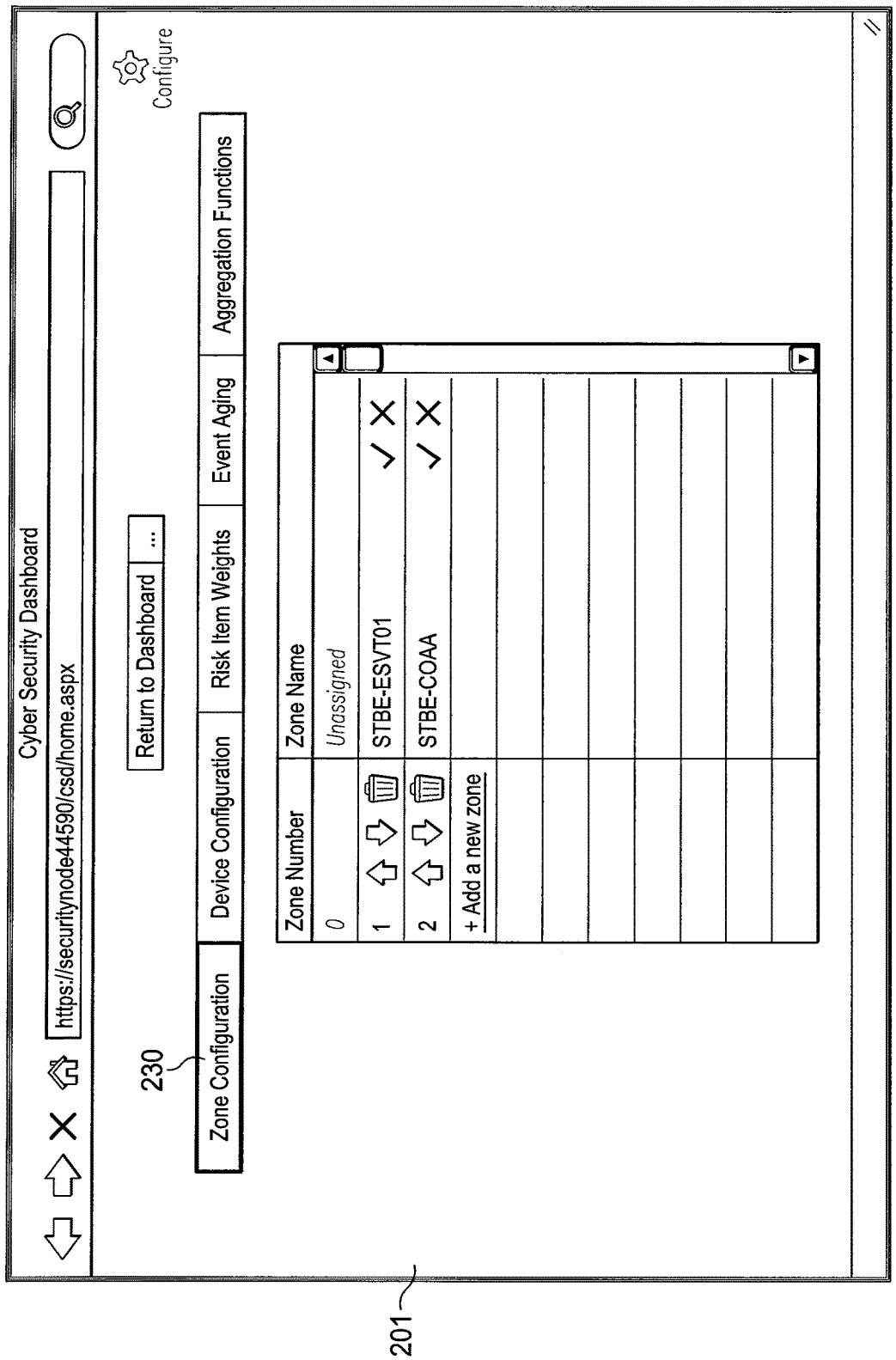

FIG. 2F illustrates another example of cyber security dashboard 201 in accordance with disclosed embodiments used, in this example, to illustrate zone configuration 230. This interface is used to assign zones to specific sensors or devices. The system or user can start with default zone called "Unassigned," as Zone 0. All devices not assigned to a zone automatically go into this zone. When a zone is created, it goes into the last available numerical slot (e.g., if Zones 1-3 exist, the new zone will be Zone 4). A user can take action on existing zones, such as renaming the zone, moving the zone up or down in the zone numbering, and deleting a zone. If a zone is deleted, all devices in that zone move into the "Unassigned" zone. Existing zone numbers after the deleted zone are shifted up one number as needed to ensure there are no "gaps" in the zone numbering.

FIG. 2G illustrates another example of cyber security dashboard 201 in accordance with disclosed embodiments used, in this example, to illustrate device configuration 231. This user interface allows the user to assign, for each device 232, a zone, a device type, and an IP address (or other network address).

FIG. 2H illustrates patch reports in accordance with disclosed embodiments used, in this example, to illustrate whether particular devices 241 (in rows) have been updated or patched on each of the corresponding systems 242 (in columns). In this example, a check mark is used to indicate that a device 241 has been fully updated or patched on the corresponding system. This user interface allows the user to assign, for each device 232, a zone, a device type, and an IP address (or other network address). This Figure also illustrates that highlighting can be used to indicate differences or "disagreement" in patches of a device on different systems or of different devices on a single system.

For example, if 75% of the nodes (devices on a system or systems for a device) agree on a patch, the system can highlight the 25% that "disagree" or are not updated in red (or in other appropriate color or means). Thus, checkboxes 243 and 244 could be highlighted to show that they "disagree" with the other 3 boxes for their respective devices.

As another example, if the "disagreement" is between 25% and 75%, then system can highlight the entire row in yellow (or in other appropriate color or means). Thus, all the checkboxes for device 245 can be highlighted.

Although FIGS. 2A through 2H illustrate examples of graphical user interface mechanisms supporting dynamic customization of cyber-security risk item rules, various changes may be made to FIGS. 2A through 2H. For example, FIGS. 2A through 2H illustrate the use of various input/output mechanisms (such as checkboxes, text boxes, hyperlinks, etc.). These are for illustration only, and other data input and/or data output mechanisms could be used. Also, the content and arrangement of each graphical user interface mechanism are for illustration only.

Figure 3:
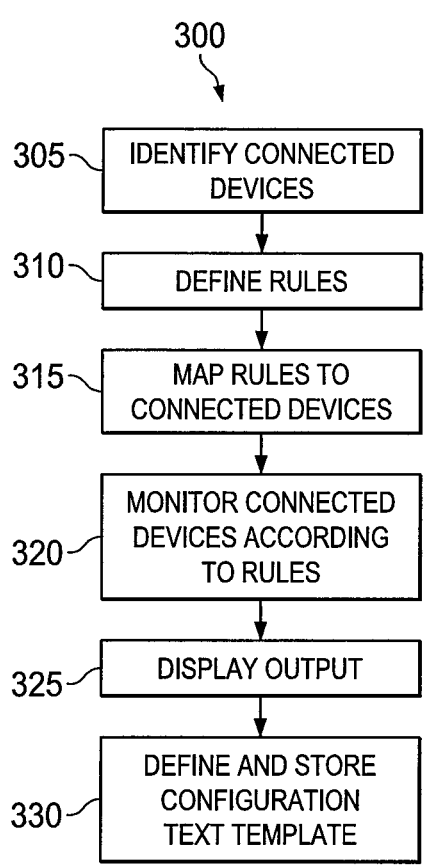
FIGS. 3 and 4 illustrate flowcharts of processes in accordance with disclosed embodiments.

FIG. 3 illustrates a flowchart of a method 300 in accordance with disclosed embodiments, as can be performed, for example, by risk manager 154 or other device or controller (referred to as the "system" below).

The system identifies a plurality of connected devices that are vulnerable to cyber-security risks (305). These could be any of the devices or components as illustrated in FIG. 1, or others.

The system interacts with a user to define a plurality of rules for risk items to be monitored among the connected devices (310). Each rule can have one or more parameters. The rules can be displayed as a plain-text sentence in the context of a plain text explanation of what the rule will do. The configurable parameters can appear similar to hyperlinks within the text. A user can click on the values and modify them directly in place.

Non-limiting examples of rules include a String-Comparison rule that compares the collected value with a predefined string or set of strings. In such as case, parameters can include an output risk weight. The rule can be displayed to the user as "Alert with a value of $Risk if the condition is detected."

Another example is a rule for date-scaling that compares the collected value (which is a formatted string containing a date) with the current date and returns a range of risk values depending on the difference between those dates. The parameters can include a minimum age value ($Age-Min), a maximum age value ($Age-Max), a minimum risk value ($Risk-Min), and a maximum risk value ($Risk-Max). The rule can be displayed to the user as "Alert if the age is greater than $Age-Min days. Start at $Risk-Min and increase to a maximum of $Risk-Max after $Age-Max days. Can convert $Age-Min and $Age-Max from milliseconds to days."

Another example is a rule for string-comparison-scaling that compares the collected value (which is a string value) with the predefined values. As the value continues to match the predefined value, the risk value begins to increase. When the parameter begins to match the comparison value, the risk is 0 until it has been in that state for "Minimum age value." Then the risk goes up to "Minimum risk value," and scales up to "Maximum risk value" when it has been in that state for "Maximum age value." It remains at "Maximum risk value" until the collected value changes. If the collected values change at any time, the timer is reset.

Another example is a rule for value-scaling that compares the collected value (which is a numeric value) with the defined value range. If it is less than the minimum value, the result is zero. If it is between the minimum and maximum values, the result is calculated based on its position and configured weights. If it is greater than the maximum value, the result is the maximum risk weight.

Another example is a rule for event-decay that compares the date/time the event occurred with the current date/time Immediately after an event occurs it will have the maximum risk value. As the events ages without reoccurring, its risk weight will gradually decay until reaching 0 by the end of the event lifespan. If the event reoccurs sooner, the value will immediately go to the maximum risk weight.

The system maps each of the rules to a corresponding one or more of the connected devices (315).

The system monitors the connected devices according to the rules (320).

The system displays an output based on the rules and a status of the connected devices (325).

The system can also define and store a configuration text template corresponding to one or more of the rules (330). The configuration text template can be customized to each risk item.

Figure 4:
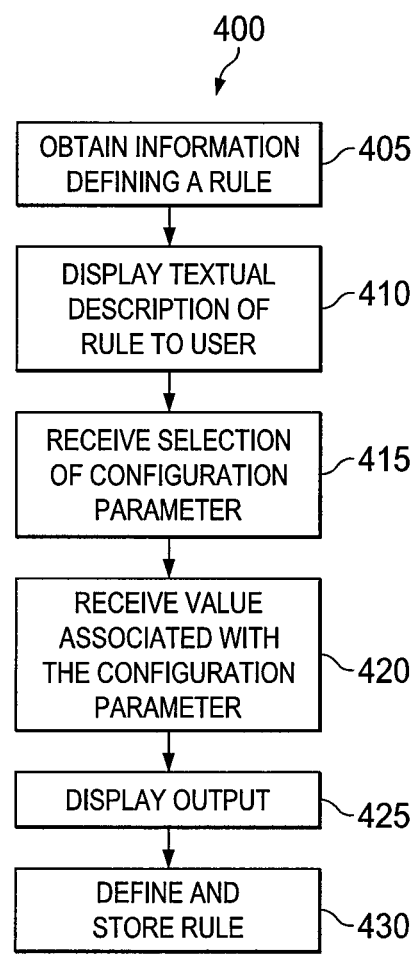

FIG. 4 illustrates a flowchart of a method 400 in accordance with disclosed embodiments, as can be performed, for example, by risk manager 154 or other device or controller (referred to as the "system" below).

The system obtains information defining a rule, the rule identifying a cyber-security risk to a computing device in an industrial process control and automation system (405). These could be any of the devices or components as illustrated in FIG. 1, or others.

The system displays a textual description describing the rule to a user (410), the textual description including a selectable configuration parameter associated with the rule. The selectable configuration parameter can be displayed as a hyperlink within the textual description. The textual description can describe what the rule will do. Each rule can be associated with at least one physical device.

The system receives the user's selection of the configuration parameter (415).

In response to receiving the user's selection of the configuration parameter, the system receives a value associated with the configuration parameter from the user (420). The value associated with the configuration parameter can be received through an input box that is displayed proximate to the configuration parameter.

The system can displays an output based on the configuration parameter and the received value (425).

The system can also define and store a rule corresponding to the configuration parameter and received value (430). In this way, the system has enabled the user to intuitively "complete" the rule for the risk manager by entering the values for the configuration parameters to be used in applying the rule.

Note that the risk manager 154 and/or the graphical user interface mechanism for dynamically customizing cyber-security risk item rules could use or operate in conjunction with any combination or all of various features described in the following previously-filed and concurrently-filed patent applications (all of which are hereby incorporated by reference):

U.S. patent application Ser. No. 14/482,888 entitled "DYNAMIC QUANTIFICATION OF CYBER-SECURITY RISKS IN A CONTROL SYSTEM";

U.S. Provisional Patent Application No. 62/036,920 entitled "ANALYZING CYBER-SECURITY RISKS IN AN INDUSTRIAL CONTROL ENVIRONMENT";

U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695 of like title filed concurrently herewith;

U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521 of like title filed concurrently herewith;

U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855 of like title filed concurrently herewith;

U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732 of like title filed concurrently herewith;

U.S. Provisional Patent Application No. 62/113,165 entitled "PATCH MONITORING AND ANALYSIS" and corresponding non-provisional U.S. patent application Ser. No. 14/871,921 of like title filed concurrently herewith;

U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503 of like title filed concurrently herewith;

U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814 of like title filed concurrently herewith;

U.S. Provisional Patent Application No. 62/114,937 entitled "APPARATUS AND METHOD FOR TYING CYBER-SECURITY RISK ANALYSIS TO COMMON RISK METHODOLOGIES AND RISK LEVELS" and corresponding non-provisional U.S. patent application Ser. No. 14/871,136 of like title filed concurrently herewith; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547 of like title filed concurrently herewith.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining information defining a rule by a risk manager system, the rule identifying a cyber-security risk to a computing device in an industrial process control and automation system;
   presenting a textual description describing an effect of the rule to a user by the risk manager system, the textual description including a selectable configuration parameter associated with the rule;
   receiving the user's selection of the configuration parameter by the risk manager system; and
   in response to receiving the user's selection of the configuration parameter, converting the configuration parameter in the textual description into an editable field and receiving a value associated with the configuration parameter from the user by the risk manager system.

2. The method of claim 1, wherein the selectable configuration parameter is displayed as a hyperlink within the textual description.

3. The method of claim 1, wherein the value associated with the configuration parameter is received through the editable field.

4. The method of claim 1, wherein the textual description describes what the rule will do.

5. The method of claim 1, wherein each rule is associated with at least one physical device.

6. The method of claim 1, further comprising:
interacting with the user, by the risk manager system, to define a plurality of rules for risk items to be monitored among a plurality of connected devices in the industrial process control and automation system;
mapping each of the rules to a corresponding one or more of the connected devices by the risk manager system;
monitoring the connected devices according to the rules by the risk manager system; and
displaying an output based on the rules and a status of the connected devices by the risk manager system.

7. The method of claim 6, wherein each rule has one or more parameters and is displayed as a plain-text sentence in a plain text explanation of what the rule will do.

8. The method of claim 6, wherein the risk manager system also defines and stores a configuration text template corresponding to one or more of the rules.

9. The method of claim 6, wherein the risk manager system also identifies the plurality of connected devices, and the plurality of connected devices are vulnerable to cyber-security risks.

10. The method of claim 6, wherein each rule has a selectable configuration parameter that is displayed as a hyperlink within a textual description of the corresponding rule.

11. A risk manager system comprising:
a controller; and
a display;
wherein the controller is configured to:
obtain information defining a rule, the rule identifying a cyber-security risk to a computing device in an industrial process control and automation system;
present a textual description describing an effect of the rule to a user, the textual description including a selectable configuration parameter associated with the rule;
receive the user's selection of the configuration parameter; and
in response to receiving the user's selection of the configuration parameter, convert the configuration parameter in the textual description into an editable field and receive a value associated with the configuration parameter from the user.

12. The risk manager system of claim 11, wherein the controller is configured to display the selectable configuration parameter as a hyperlink within the textual description.

13. The risk manager system of claim 11, wherein the controller is configured to receive the value associated with the configuration parameter through the editable field.

14. The risk manager system of claim 11, wherein the textual description describes what the rule will do.

15. The risk manager system of claim 11, wherein each rule is associated with at least one physical device.

16. The risk manager system of claim 11, wherein the controller is further configured to:
interact with the user to define a plurality of rules for risk items to be monitored among a plurality of connected devices in the industrial process control and automation system,
map each of the rules to a corresponding one or more of the connected devices,
monitor the connected devices according to the rules, and
display an output based on the rules and a status of the connected devices.

17. The risk manager system of claim 16, wherein each rule has one or more parameters, and the controller is configured to display each rule as a plain-text sentence in a plain text explanation of what the rule will do.

18. The risk manager system of claim 16, wherein the controller is further configured to define and store a configuration text template corresponding to one or more of the rules.

19. The risk manager system of claim 16, wherein the controller is further configured to identify the plurality of connected devices, and the plurality of connected devices are vulnerable to cyber-security risks.

20. The risk manager system of claim 16, wherein each rule has a selectable configuration parameter that the controller is configured to display as a hyperlink within a textual description of the corresponding rule.

21. A non-transitory machine-readable medium encoded with executable instructions that, when executed, cause one or more processors of a risk manager system to:
obtain information defining a rule, the rule identifying a cyber-security risk to a computing device in an industrial process control and automation system;
present a textual description describing an effect of the rule to a user, the textual description including a selectable configuration parameter associated with the rule;
receive the user's selection of the configuration parameter; and
in response to receiving the user's selection of the configuration parameter, convert the configuration parameter in the textual description into an editable field and receive a value associated with the configuration parameter from the user.

22. The non-transitory machine-readable medium of claim 21, further encoded with executable instructions that, when executed, cause the one or more processors of the risk manager system to:
interact with the user to define a plurality of rules for risk items to be monitored among a plurality of connected devices in the industrial process control and automation system;
map each of the rules to a corresponding one or more of the connected devices;
monitor the connected devices according to the rules; and
display an output based on the rules and a status of the connected devices.

* * * * *